United States Patent [19]
Saari

[11] 3,810,987
[45] May 14, 1974

[54] BLOOD PRESSURE LOWERING METHOD USING AN APORPHINE

[75] Inventor: Walfred S. Saari, Lansdale, Pa.

[73] Assignee: Merck & Co., Inc., Rahway, N.J.

[22] Filed: June 12, 1972

[21] Appl. No.: 261,826

[52] U.S. Cl. .............................................. 424/258
[51] Int. Cl............................................ A61k 27/00
[58] Field of Search ................................... 424/258

[56] References Cited
OTHER PUBLICATIONS

Chem. Abst. 8th Collective Index (1967–1971) Vol. 66–75 pages 2868S & 2869S.

*Primary Examiner*—Sam Rosen

[57] ABSTRACT

Method for lowering mean arterial blood pressure by administering an aporphine derivative. Compounds prepared by conventional procedures.

8 Claims, No Drawings

BLOOD PRESSURE LOWERING METHOD USING AN APORPHINE

This invention is concerned with the management of hypertension by the administration of an aporphine derivative.

The aporphine derivatives described in this invention which have been found to be useful in the management of hypertension are 1-$R^1$-6-$R^6$-9-$R^9$-10-$R^{10}$-11-$R^{11}$-5,6,6a,7-tetrahydro-4H-dibenzo[de, g]-quinoline wherein $R^1$, $R^9$, $R^{10}$ and $R^{11}$ separately represent hydrogen, hydroxy and $C_{1-3}$ alkoxy and additionally $R^{10}$ and $R^{11}$ taken together can represent methylenedioxy; $R^6$ represents $C_{1-3}$ alkyl; and at least one of the variables $R^1$, $R^9$, $R^{10}$ or $R^{11}$ represents a substituent other than hydrogen with only one of the variables $R^1$, $R^9$, $R^{10}$ or $R^{11}$ representing hydroxyl. Of particular interest are those compounds wherein $R^6$ is methyl and any other substituent, when present, is methoxy or hydroxy. As 6-methyl-5,6,6a,7-tetrahydro-4H-dibenzo[de, g]-quinoline is known by the trivial name aporphine, derivatives of this compound will be identified herein by use of this shorter, trivial name.

The aporphine derivatives useful in the method of this invention are prepared by conventional procedures which vary depending upon the particular substituents attached to the dibenzoquinoline nucleus. The 10,11-methylenedioxy aporphine compound is readily prepared from apomorphine by treatment with dibromomethane in the presence of a strong base. The reaction advantageously is carried out in an aprotic solvent such as dimethyl sulfoxide, tetrahydrofuran, dioxane, and the like in the absence of ambient air, preferably under nitrogen. Slight warming of the reaction mixture is conveniently employed to bring the reaction to completion in a reasonable period of time.

The 10-hydroxy-aporphine is prepared from 10,11-methylenedioxy aporphine by treatment with metallic sodium in the presence of liquid ammonia and an aprotic solvent such as tetrahydrofuran, dimethyl sulfoxide, dioxane, and the like. The reaction is carried out at ambient temperature.

Since the starting material, apomorphine, for the synthesis of the 10,11-methylenedioxy and 10-hydroxy derivatives is optically active, then these derivatives which are derived from apomorphine are also optically active. In addition they possess the same absolute stereochemistry as apomorphine, namely the rectus or R configuration.

The 9-alkoxy- and 9-hydroxy-aporphine and other N-alkyl derivatives can be prepared by reacting 2-nitro-5-alkoxytoluene with 2-alkylisoquinolinium iodide in the presence of a base. The reaction advantageously is carried out in alcohol using the corresponding sodium alkoxide as the base with heating up to the reflux temperature of the reaction mixture. The 1-(5-alkoxy-2-nitrobenzal)-2-alkyl-1,2,3,4-tetrahydroisoquinoline obtained then is reduced catalytically advantageously with a Group VIII metal oxide to provide the corresponding 2-amino compound. The resulting amine is diazotized with an alkali metal nitrite and then cyclized to the desired 9-alkoxy-6-alkyl-5,6,6a,7-tetrahydro-4H-dibenzo[de, g]-quinoline. Dealkylation of the 9-alkoxy group provides the 9-hydroxy product.

The 11-alkoxy- and 11-hydroxy-aporphine and the corresponding N-lower alkyl derivatives are prepared from the appropriate 2-nitro-3-alkoxybenzyl chloride which upon reaction with 2-benzoyl(or phenyl lower alkanoyl)-1-cyano-1,2,-dihydroisoquinoline provides 2-benzoyl(or phenyl alkanoyl)-1-cyano-1-(3-alkoxy-2-nitrobenzyl)-1,2-dihydroisoquinoline. The reaction advantageously is carried out in an aprotic solvent with cooling using a base such as sodium hydride and preferably protected from the ambient air by reaction under nitrogen. The intermediate thus obtained is reacted with Triton B (tetramethylammonium hydroxide) under nitrogen in the presence of an aprotic solvent and at ambient temperature to provide 1-[3-alkoxy-2-nitrobenzyl]-isoquinoline. This is then alkylated by treatment with a lower alkyl iodide providing the 2-lower alkylisoquinolinium iodide. Diazotization and cyclization of this product by the process described above forms the 11-lower alkoxy-6-lower alkyl-5,6,6a,7-tetrahydro-4H-dibenzo[de, g]-quinoline. Dealkylation of this compound provides the desired 11-hydroxy product.

The 1-alkoxy and the 1-hydroxy isomers are also prepared by the preceding procedure using as starting material the appropriate 2-benzoyl-1-cyano-7-alkoxy-1,2-dihydroisoquinoline. Additionally the 1,11-dialkoxy and 1,11-dihydroxy products are made by the preceding method employing 7-alkoxy-2-benzoyl-1-cyano-1-(3-alkoxy-2-nitrobenzyl)-1,2-dihydroisoquinoline (prepared from the appropriate 3-alkoxy-2-nitrobenzyl chloride and 2-benzoyl-1-cyano-7-alkoxy-1,2-dihydroisoquinoline).

The 9,11-dialkoxy isomers are similarly prepared employing a 3,5-dialkoxy-2-nitrobenzyl chloride and 2-benzoyl-1-cyano-1,2-dihydroisoquinoline.

Since these derivatives are prepared by total synthesis, the products are obtained as racemic mixtures. If so desired, the tetrahydroisoquinoline intermediates or the final aporphine products can be resolved using standard resolution agents such as the optically active tartaric acids and standard resolving procedures to obtain the optically active products.

The procedure for evaluating the antihypertensive activity of the active agents of this invention comprises administering the compound either orally or intraperitoneally in spontaneously hypertensive rats of the Wistar-Okamoto strain. Arterial pressure is recorded continuously in these animals through an indwelling aortic catheter introduced through the caudal artery. The animals are allowed free movement in the metabolism cage during the measurements. Results of the test are provided in the following examples which also describe the preparation of the active products employed in the method of this invention.

EXAMPLE 1

6aR-10,11-Methylenedioxyaporphine Hydrochloride

To a solution of 12.0 g. (0.0384 mole) of apomorphine hydrochloride hemihydrate in 100 ml. of dimethyl sulfoxide under nitrogen is added a solution of 4.8 g. sodium hydroxide in 50 ml. of water. The solution is warmed to 80° C. and 7.0 g. dibromomethane is added over 20 minutes. After stirring at 80° C. under nitrogen for an additional 3 hours, the reaction mixture is cooled, poured on 400 ml. of ice water and filtered. The filtered solid is washed well with water, dried at 50° C. under vacuum and dissolved in 200 ml. ethyl acetate. Some material which does not dissolve in ethyl acetate is filtered off. The solution is dried over sodium sulfate, filtered and concentrated to give 5.8 g. of an oil which is then chromatographed on 200 g. of silica gel. Elution with 5% methanol-chloroform gives 4.1 g. of crude product which is purified further by conversion to the hydrochloride salt with ethanolic-anhydrous hydrogen chloride in methanol. Precipitation with ethyl acetate gives the hydrochloride, 3.7 g. (30.5%), m.p. 273°–279° C. dec., darkens at 253° C. The hydrochloride can be recrystallized from methanol-ethyl acetate.

Analysis calculated for $C_{18}H_{17}NO_2 \cdot HCl$:
  C, 68.46; H, 5.74; N, 4.44;
Found: C, 68.19; H, 5.83; N, 4.30.

When tested by the protocol described supra this product was found to exhibit pronounced antihypertensive effect when administered i.p. at 20 mg./kg. The mean arterial blood pressure was reduced by at least 40 mm Hg. with no significant increase in heart rate.

EXAMPLE 2

6aR-10-Hydroxyaporphine Hydrochloride

Sodium spheres are added to a solution of 3.6 g. (0.0114 mole) of 6aR-10,11-methylenedioxyaporphine hydrochloride in 25 ml. tetrahydrofuran and 200 ml. liquid ammonia until the blue color due to excess sodium persists for 2 hours. After the ammonia has all evaporated, 10 ml. of methanol followed by water is added and the crude product is extracted into ethyl acetate. The ethyl acetate extract is dried over sodium sulfate, filtered and concentrated. The residue, 2.0 g., is chromatographed on 180 g. of silica gel and the product eluted with 5% methanol-chloroform. The hydrochloride, m.p. 252° C., darkens at 232° C., 1.65 g. (50.4%), is obtained by dissolving the base in methanol, adding excess ethanolic-anhydrous hydrogen chloride followed by precipitation with ethyl acetate.

Analysis calculated for $C_{17}H_{17}NO \cdot HCl$:
  C, 70.95; H, 6.30; N, 4.87;
Found: C, 70.69; H, 6.29; N, 4.69.

When tested by the protocol described supra this product was found to exhibit pronounced antihypertensive effect when administered i.p. at 20 mg./kg. The mean arterial blood pressure was reduced by at least 40 mm Hg. with no significant increase in heart rate.

EXAMPLE 3

9-Methoxyaporphine Hydrochloride

Step A

Preparation of 1-(5-Methoxy-2-nitrobenzal)-2-methyl-1,2,3,4-tetrahydroisoquinoline A mixture of 8.40 g. (0.050 mole) of 3-methyl-4-nitroanisole and 14.0 g. (0.050 mole) of 2-methylisoquinolinium iodide is added in one portion to a solution of 2.3 g. of sodium in 125 ml. of absolute ethanol. The solution is stirred at reflux for 10 minutes and then allowed to stand at room temperature overnight. After cooling, the red solid is removed by filtration and recrystallized from 15 ml. of ethanol to give 7.5 g. (48.4%) of product, m.p. 79°–81° C. The melting point is not improved by further recrystallization from ethanol.

Analysis calculated for $C_{18}H_{18}N_2O_3$:
  C, 69.66; H, 5.85; N, 9.03;
Found: C, 69.59; H, 5.88; N, 8.82.

Step B

Preparation of 1-(2-Amino-5-methoxybenzyl)-2-methyl-1,2,3,4-tetrahydroisoquinoline Dihydrochloride A mixture of 6.25 g. (0.0202 mole) of 1-(5-methoxy-2-nitrobenzal)-2-methyl-1,2,3,4-tetrahydroisoquinoline, 200 mg. of an 81 percent platinum oxide catalyst and 200 ml. of ethyl acetate is hydrogenated at an initial pressure of 42 lbs./sq. in. until hydrogen uptake is complete. The catalyst is removed by filtration and the filtrate is concentrated under vacuum. The residue is dissolved in a minimum amount of absolute ethanol, excess ethanolic-anhydrous hydrogen chloride solution is added and the dihydrochloride precipitated with ethyl acetate. Recrystallization from ethanol-ethyl acetate gives 5.2 g. (72.5%) of the dihydrochloride which does not possess a definite melting point, but rather undergoes slow decomposition from 174° C. to 230° C.

Step C

Preparation of 9-Methoxyaporphine Hydrochloride

A solution of 2.8 g. (7.9 mmole) of 1-(2-amino-5-methoxybenzyl)-2-methyl-1,2,3,4-tetrahydroisoquinoline dihydrochloride in 30 ml. of glacial acetic acid is cooled in an ice bath while 1.8 ml. of concentrated sulfuric acid is added. A solution of 0.62 g. (9.0 mmole) of sodium nitrite in 5 ml. of water is added over 15 minutes to the stirred solution at 12° C. After addition is complete, the reaction is kept at 5°–10° C. for 30 minutes more. Sulfamic acid, 100 mg., and 35 ml. of cold 3N sulfuric acid are added and the mixture allowed to warm to room temperature over 10 minutes and then warmed on the steam bath for 1 hour. Zinc dust, 2.0 g., is added and after stirring on the steam bath for one-half hour, the reaction mixture is filtered and cooled. The pH is adjusted to 9–10 with concentrated ammonium hydroxide in the cold and the crude product is extracted with two 50-ml. portions of chloroform. After drying over sodium sulfate, filtering and concentrating, the residual oil (2.4 g.) is dissolved in ethanol and treated with excess ethanolic-anhydrous hydrogen chloride. Precipitation with ethyl acetate gives 0.50 g. (21%) of the hydrochloride, m.p. 246°–52° C., dec., darken at 237° C. An analytical sample, m.p. 247.0°–252.0° C., dec., darken at 242° C., is obtained by recrystallization from ethanol-methanol-ethyl acetate-hexane.

Analysis calculated for $C_{18}H_{19}NO \cdot HCl$:
  C, 71.63; H, 6.68; N, 4.64;
Found: C, 71.62; H, 6.72; N, 4.58.

EXAMPLE 4

9-Hydroxyaporphine Hydrobromide

A solution of 450 mg. (1.70 mmole) of 9-methoxyaporphine in 15 ml. of 48 percent hydrobromic acid and 15 ml. of glacial acetic acid is stirred at reflux under nitrogen for 18 hours. The solution is concentrated under vacuum to dryness, redissolved in 10 ml. of water and concentrated again to dryness under vacuum. This is repeated once more with 10 ml. of water and then twice with 10 ml. absolute ethanol. The residue is recrystallized from methanol-ethyl acetate to give 100 mg. (17.8%) of 9-hydroxyaporphine hydrobromide, m.p. 267.9°–269.9° C., dec.

Analysis calculated for $C_{17}H_{17}NO \cdot HBr$:
  C, 61.45; H, 5.46; N, 4.22;
Found: C, 60.80; H, 5.49; N, 4.06.

EXAMPLE 5

11-Methoxyaporphine Hydrochloride

Step A

Preparation of 3-Methoxy-2-nitrobenzyl Alcohol

Sodium borohydride, 7.0 g., is added over 10 minutes to a stirred solution of 26.0 g. (0.144 mole) 3-methoxy-2-nitrobenzaldehyde in 200 ml. tetrahydrofuran and 50 ml. water. Occasional cooling is necessary to keep the reaction temperature below 35° C. After one hour, 2.0 g. more sodium borohydride is added and stirring is continued for another two hours. The reaction mixture is then diluted with water, concentrated under vacuum to remove most of the tetrahydrofuran and the crude product is extracted into ether. After washing with water, the ether extract is dried over sodium sulfate, filtered and concentrated to give 25.8 g. (98.3%) of the alcohol, m.p. 64.4°–68.4° C., soften at 55° C. An analytical sample, m.p. 66.0°–68.4° C., is obtained by recrystallization from benzene-hexane.

Analysis calculated for $C_8H_9NO_4$:
C, 52.46; H, 4.95; N, 7.65;
Found: C, 52.65; H, 5.11; N, 7.48.

Step B

Preparation of 3-Methoxy-2-nitrobenzyl Chloride

A solution of 25.8 g. (0.141 mole) of 3-methoxy-2-nitrobenzyl alcohol and 40.7 g. of triphenylphosphine in 600 ml. of carbon tetrachloride is stirred at reflux for 12 hours. After filtering and washing the precipitate with benzene, the organic solvents are removed under vacuum. The residue is dissolved in a minimum amount of benzene and chromatographed on 500 g. of silica gel. Elution with 3.4 liters of benzene gives 25.0 g. (88.1%) of the benzyl chloride, m.p. 73.5°–75.5° C. An analytical sample is obtained by recrystallization from benzene-hexane.

Analysis calculated for $C_8H_8ClNO_3$:
C, 47.66; H, 4.00; N, 6.95;
Found: C, 47.77; H, 4.09; N, 6.76.

Step C

Preparation of 2-Benzoyl-1-cyano-1-(3-methoxy-2-nitrobenzyl)-1,2-dihydroisoquinoline To a solution of 4.76 g. (0.0237 mole) of 3-methoxy-2-nitrobenzyl chloride and 6.15 g. (0.0237 mole) of 2-benzoyl-1-cyano-1,2-dihydroisoquinoline, in 40 ml. dry dimethylformamide under nitrogen at ice-bath temperature, is added in one portion 1.2 g. of a 51 percent dispersion of sodium hydride in mineral oil. After stirring at 0°–5° C. for 30 minutes, the reaction mixture is allowed to stir at room temperature for 18 hours. Water is added to precipitate the product which is filtered, washed with a little ether and dried to give 8.1 g. (80.2%) of the alkylated product, m.p. 169.7°–173.2° C. An analytical sample, m.p. 172.7°–174.7° C., is obtained by recrystallization from ethyl acetate-hexane.

Analysis calculated for $C_{25}H_{19}N_3O_4$:
C, 70.58; H, 4.50; N, 9.88;
Found: C, 70.53; H, 4.71; N, 9.62.

Step D

Preparation of 1-[3-Methoxy-2-nitrobenzyl]-isoquinoline

To a rapidly stirred mixture of 24.5 g. (0.0576 mole) of 2-benzoyl-1-cyano-1-(3-methoxy-2-nitrobenzyl)-1,2-dihydroisoquinoline and 245 ml. of dry dimethylformamide under nitrogen at room temperature, 45 ml. of Triton B are added in a stream. After stirring for 30 minutes, the reaction mixture is poured on ice. The product is filtered and dried to give 16.8 g. (99.4%) of the isoquinoline, m.p. 120.5°–124.5° C., soften at 115.5° C. An analytical sample, m.p. 127.5°–130.0° C., softens at 124.5° C., is obtained after two recrystallizations from benzene-hexane.

Analysis calculated for $C_{17}H_{14}N_2O_3$:
C, 69.37; H, 4.80; N, 9.52;
Found: C, 69.71; H, 5.06; N, 9.21.

Step E

Preparation of 1-(3-Methoxy-2-nitrobenzyl)-2-methylisoquinolinium Iodide

A solution of 17.5 g. (0.0595 mole) of 1-(3-methoxy-2-nitrobenzyl)-isoquinoline and 35 ml. methyl iodide in 100 ml. acetone is heated at reflux for 20 hours. After cooling, ether is added and the product is filtered and dried to give 24.2 g. (93.2%) of the quarternary compound, m.p. 198.5°–201.5° C., dec.

Step F

Preparation of 11-Methoxyaporphine Hydrochloride

A total of 24.0 g. (0.055 mole) of 1-(3-methoxy-2-nitrobenzyl)-2-methylisoquinolinium iodide is reduced to the tetrahydroisoquinoline in four batches of six grams each. A solution of 6.0 g. of the quarternary methiodide in 130 ml. methanol and 90 ml. water is hydrogenated with 0.4 g. platinum oxide catalyst at an initial pressure of 40 lbs./sq. in. until hydrogen uptake is complete. The catalyst is removed by filtration and the filtrate is concentrated to dryness under vacuum. The residue is dissolved in a minimum amount of absolute ethanol, excess ethanolic-anhydrous hydrogen chloride solution is added and the mixed hydroiodide-hydrochloride salt precipitated with ethyl acetate. The mixed salt, 15.9 g., is dissolved in 100 ml. glacial acetic acid, cooled in an ice bath and 9.0 ml. of concentrated sulfuric acid are added. A solution of 3.45 g. of sodium nitrite in 20 ml. water is added over one-half hour to the tetrahydroisoquinoline compound while the temperature is maintained at 5°–10° C. After addition is complete, the reaction mixture is stirred at 0° C. for an additional one-half hour. Sulfamic acid, 0.5 g. and 150 ml. of cold 3N sulfuric acid are added and the mixture allowed to warm to room temperature over 20 minutes and then warmed on the steam bath for one-half hour. Zinc dust, 10 g., is added portionwise and after stirring at steam bath temperature for one-half hour, the reaction mixture is cooled and filtered. Concentrated ammonium hydroxide is added to make the reaction mixture basic and the crude product is extracted with three 150-ml. portions of ether. After drying over magnesium sulfate, filtering and concentrating under vacuum, the residue is taken up in absolute ethanol, acidified with excess ethanolic-anhydrous hydrogen chloride solution and the product precipitated with ethyl acetate to give 2.91 g. (17.5%) of 11-methoxy-aporphine hydrochloride, m.p. 249°–51° C., dec., darkens at 242° C.

Analysis calculated for $C_{18}H_{19}NO \cdot HCl$:
C, 71.63; H, 6.74; N, 4.64;
Found: C, 71.45; H, 6.74; N, 4.52.

This product was found to exhibit a pronounced antihypertensive effect when administered at 20 mg./kg., i.p. when tested by the above described protocol. The mean arterial blood pressure was reduced by 40 mm Hg. or more with no appreciable effect on heart rate. Additionally, administration of 20 mg./kg., p.o., produced a lowering of the mean arterial blood pressure between 20–29 mm Hg.

EXAMPLE 6

11-Hydroxyaporphine Hydrobromide

11-Methoxyaporphine hydrochloride, 1.0 g. (3.31 mmole), is converted to the free base with 10 percent sodium hydroxide and extraction with ethyl ether. After removal of the ethyl ether, the residue is heated at reflux for 6 hours under nitrogen with 50 ml. of 48 percent hydrobromic acid solution. The solution is then concentrated under vacuum to dryness, redissolved in 40 ml. water and reconcentrated to dryness. This is repeated once more with 40 ml. water and then twice with 40 ml. absolute ethanol. The residue is recrystallized from a methanol-ethyl acetate mixture to give 0.78 g. (70.9%) of 11-hydroxyaporphine hydrobromide, m.p. 280°–96° C. dec.

Analysis calculated for $C_{17}H_{17}NO \cdot HBr$:
C, 61.45; H, 5.46; N, 4.22;
Found: C, 61.92; H, 5.74; N, 4.73.

This product was found to have pronounced antihypertensive effect at a dosage of 5 mg./kg., p.o., when tested by the protocol described above. The mean arterial blood pressure was reduced by 40 mm Hg. or more for a period of several hours with no significant increase in heart rate at this dose level. Pronounced antihypertensive effect was also observed when this product was administered i.p. at 20 mg./kg. with no significant increase in heart rate.

EXAMPLE 7

1-Methoxyaporphine Hydrochloride

This product is prepared following the procedures described in Example 5, Steps C-F, except for the replacement of 3-methoxy-2-nitrobenzyl chloride and the Reissert compound by equivalent quantities of 2-nitrobenzyl chloride and 2-benzoyl-1-cyano-7-methoxy-1,2-dihydroisoquinoline respectively.

EXAMPLE 8

1-Hydroxyaporphine Hydrobromide

This product is obtained by the demethylation of 1-methoxyaporphine hydrochloride by substantially the same method described in Example 6.

EXAMPLE 9

9,11-Dimethoxyaporphine Hydrochloride

This product also is prepared by essentially the same procedures described in Example 5, Steps C-F, employing equivalent quantity of 3,5-dimethoxy-2-nitrobenzyl chloride (prepared from the corresponding alcohol by the process described in Step B of Example 5) in place of the 3-methoxy-2-nitrobenzyl chloride used in Step C of Example 5.

The aporphine derivatives can be administered orally or parenterally to humans at a dose between about 100-500 mgs. per day as prescribed by a physician. Conventional formulation ingredients and procedures can be used in preparing suitable dosage forms. The following formulations are illustrative of a suitable oral and parenteral composition.

Tablet Composition

|  | mgs. per Tablet |
|---|---|
| 11-Hydroxyaporphine Hydrobromide | 250 |
| Dibasic calcium phosphate | 50 |
| Lactose U.S.P. | 50 |
| Starch U.S.P. | about 40 |
| Magnesium stearate U.S.P. | 0.5 to 2.5 |

About 5 mgs. of the starch are used as starch paste in the granulation step for the drug component. The remaining starch may be used to promote disintegration of the tablet.

Other commonly used diluents such as cellulose, mannitol and the like may be substituted for the dibasic calcium phosphate or lactose.

Sterile Solution for Parenteral Use

|  | Per ml. |
|---|---|
| 6aR-10-Hydroxyaporphine Hydrochloride | 50 to 100 mg. |
| Benzyl alcohol N.F. | 9 mg. |
| Sodium chloride U.S.P. | 9 mg. |
| Water-for-Injection U.S.P. | q.s. |

The final parenteral solution may be sterilized by autoclaving or by aseptic filtration through a bacterial-retentive filter.

Other preservatives and agents for making the injection iso-osmotic may be used.

I claim:
1. A method for the lowering of the mean arterial blood pressure of a hypertensive mammal comprising administering to a hypertensive mammal a sufficient quantity of 1-$R^1$-6-$R^6$-9-$R^9$-10-$R^{10}$-11-$R^{11}$-5,6,6a,7-tetrahydro-4H-dibenzo[de, g]-quinoline or a pharmacologically acceptable salt thereof to effect the lowering of the mean arterial blood pressure, wherein said active product $R^1$, $R^9$, $R^{10}$ and $R^{11}$ separately represent hydrogen, hydroxy, and $C_{1-3}$ alkoxy and additionally $R^{10}$ and $R^{11}$ taken together represent methylenedioxy, $R^6$ represents $C_{1-3}$ alkyl; and at least one of the variables $R^1$, $R^9$, $R^{10}$ or $R^{11}$ represent a substituent other than hydrogen with only one of the variables $R^1$, $R^9$, $R^{10}$ or $R^{11}$ representing hydroxyl.

2. A method as claimed in claim 1 wherein the substituent $R^6$ in the active product is methyl.

3. A method as claimed in claim 1 wherein the active product is 11-methoxyaporphine.

4. A method as claimed in claim 1 wherein the active product is 11-hydroxyaporphine.

5. A method as claimed in claim 1 wherein the active product is 6aR-10,11-methylenedioxyaporphine.

6. A method as claimed in claim 1 wherein the active product is 6aR-10-hydroxyaporphine.

7. A method as claimed in claim 1 wherein the active product is 9-methoxyaporphine.

8. A method as claimed in claim 1 wherein the active product is 9-hydroxyaporphine.

* * * * *